(12) United States Patent
Huang et al.

(10) Patent No.: US 10,503,973 B2
(45) Date of Patent: Dec. 10, 2019

(54) PUPIL DETECTION DEVICE

(71) Applicant: PixArt Imaging Inc., Hsin-Chu County (TW)

(72) Inventors: Yu-Hao Huang, Hsin-Chu County (TW); Ming-Tsan Kao, Hsin-Chu County (TW); Yi-Fang Lee, Hsin-Chu County (TW); En-Feng Hsu, Hsin-Chu County (TW); Meng-Huan Hsieh, Hsin-Chu County (TW); Nien-Tse Chen, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 10 days.

(21) Appl. No.: 16/213,043

(22) Filed: Dec. 7, 2018

(65) Prior Publication Data

US 2019/0108395 A1    Apr. 11, 2019

Related U.S. Application Data

(63) Continuation of application No. 15/253,503, filed on Aug. 31, 2016, now Pat. No. 10,198,631, which is a continuation of application No. 14/054,724, filed on Oct. 15, 2013, now Pat. No. 9,530,051.

(30) Foreign Application Priority Data

Oct. 23, 2012   (TW) .............................. 101139163 A

(51) Int. Cl.
    *G06F 3/01*    (2006.01)
    *G06K 9/00*    (2006.01)
    *H04N 5/235*   (2006.01)

(52) U.S. Cl.
    CPC ......... *G06K 9/00604* (2013.01); *G06F 3/013* (2013.01); *H04N 5/2354* (2013.01)

(58) Field of Classification Search
    CPC ...................................................... G06F 3/013
    See application file for complete search history.

(56) References Cited

U.S. PATENT DOCUMENTS

| | | | |
|---|---|---|---|
| 8,913,789 B1* | 12/2014 | Starner | G01S 17/06 382/103 |
| 2003/0223037 A1* | 12/2003 | Chernyak | A61B 3/1015 351/209 |
| 2012/0038793 A1* | 2/2012 | Shimizu | H04N 5/145 348/231.99 |
| 2013/0201080 A1* | 8/2013 | Evans | G02B 27/017 345/8 |

* cited by examiner

*Primary Examiner* — William C Vaughn, Jr.
*Assistant Examiner* — Jerry T Jean Baptiste
(74) *Attorney, Agent, or Firm* — WPAT, PC

(57) ABSTRACT

There is provided a pupil tracking device including an active light source, an image sensor and a processing unit. The active light source emits light toward an eyeball alternatively in a first brightness value and a second brightness value. The image sensor captures a first brightness image corresponding to the first brightness value and a second brightness image corresponding to the second brightness value. The processing unit identifies a brightest region at corresponding positions of the first brightness image and the second brightness image as an active light image.

17 Claims, 5 Drawing Sheets

PUPIL DETECTION DEVICE

CROSS REFERENCE TO RELATED APPLICATION

This application is a continuation application of U.S. application Ser. No. 15/253,503, filed on Aug. 31, 2016, which is a continuation application of U.S. application Ser. No. 14/054,724, filed on Oct. 15, 2013 and claims the priority benefit of Taiwan Patent Application Serial Number 101139163, filed on Oct. 23, 2012, the full disclosures of which are incorporated herein by reference.

BACKGROUND

1. Field of the Disclosure

This disclosure generally relates to an interactive system and, more particularly, to a pupil tracking device that includes at least one active light source to be served as a positioning reference point.

2. Description of the Related Art

As the interactive control mechanism can provide more intuitive operation to users, it has been widely applied to various multimedia systems, especially to an image display system having a display screen.

A remote controller capable of capturing images is generally served as a human-machine interface and the remote controller can be manufactured as various properties, such as a bat, a racket, a club and so on. There is another kind of interactive human-machine interface that does not need any hand-held device. For example, a pupil tracking device can perform the interactive operation according to the variation of a line of sight of the user.

The conventional pupil tracking device has the problem that it is easily affected by ambient light sources. For example, FIG. 1 shows a schematic diagram of an eye image 9, which contains a pupil image Ip and an ambient light source image Io. When the pupil image Ip overlaps the ambient light source image Io, it may not be able to position the pupil image Ip correctly such that the pupil tracking may not be performed correctly.

Accordingly, the present disclosure further provides a pupil tracking device that may eliminate the effect from ambient light sources thereby improving the accuracy of pupil tracking.

SUMMARY

The present disclosure provides a pupil tracking device that includes at least one active light source emitting light toward an eyeball to form a positioning reference point.

The present disclosure further provides a pupil tracking device suitable to be applied to a head accessory.

The present disclosure provides a pupil tracking device including a single light source, an image sensor and a processing unit. The single light source is configured to emit light toward an eyeball in a first brightness value at a first time to form a first reflection spot on the eyeball, and the single light source configured to emit light toward the eyeball in a second brightness value at a second time to form a second reflection spot on the eyeball, wherein the first brightness value is different from the second brightness value, and the first time is different from the second time. The image sensor is configured to capture a first image containing a brightest region associated with the first reflection spot on the eyeball corresponding to the first brightness value and a second image containing a brightest region associated with the second reflection spot on the eyeball corresponding to the second brightness value. The processing unit is electrically coupled to the image sensor and the single light source, and configured to calculate a differential image between the first image and the second image, and identify a darkest region in the differential image as an image of the single light source projected on the eyeball when a position of the darkest region in the differential image corresponds to a position of the brightest region in the first image or the brightest region in the second image.

The present disclosure further provides a pupil tracking device including a single light source, an image sensor and a processing unit. The single light source is configured to emit light toward an eyeball in a first brightness value at a first time to form a first reflection spot on the eyeball, and the single light source configured to emit light toward the eyeball in a second brightness value at a second time to form a second reflection spot on the eyeball, wherein the first brightness value is different from the second brightness value, and the first time is different from the second time. The image sensor is configured to capture a first image containing a brightest region associated with the first reflection spot on the eyeball corresponding to the first brightness value and a second image containing a brightest region associated with the second reflection spot on the eyeball corresponding to the second brightness value. The processing unit is electrically coupled to the image sensor and the single light source, and configured to calculate a differential image by subtracting the second image from the first image, and identify one of two darkest regions in the differential image having a smaller area and corresponding to a position of the brightest region in the first or second image as an image of the single light source projected on the eyeball, and the other one of the two darkest regions in the differential image having a larger area as a pupil image.

The present disclosure further provides a pupil tracking device including a single light source, an image sensor and a processing unit. The single light source is configured to emit light toward an eyeball in a first brightness value at a first time to form a first reflection spot on the eyeball, and the single light source configured to emit light toward the eyeball in a second brightness value at a second time to form a second reflection spot on the eyeball, wherein the first brightness value is equal to the second brightness value, and the first time is different from the second time. The image sensor is configured to capture, using a first exposure time, a first image containing a brightest region associated with the first reflection spot on the eyeball corresponding to the first brightness value and capture, using a second exposure time, a second image containing a brightest region associated with the second reflection spot on the eyeball corresponding to the second brightness value, wherein the first exposure time is different from the second exposure time. The processing unit is electrically coupled to the image sensor and the single light source, and configured to calculate a differential image between the first image and the second image, and identify a darkest region in the differential image as an image of the single light source projected on the eyeball when a position of the darkest region in the differential image corresponds to a position of the brightest region in the first image or the brightest region in the second image.

In one aspect, the processing unit is further configured to identify a pupil position according to the first brightness image or the second brightness image, wherein when the first brightness value is higher than the second brightness value, the processing unit identifies a plurality of pixels around a lowest gray level in the first brightness image and having gray levels within a gray level range as a pupil region, and calculates a gravity center or a center of the pupil region to be served as the pupil position.

In one aspect, the pupil tracking device further includes a memory unit configured to save pupil coordinate information associated with the active light image and the pupil position. The processing unit may calculate a current pupil coordinate according to the pupil coordinate information.

In one aspect, the first brightness image and the second brightness image may be implemented by changing the exposure time and/or the gain of the image sensor without changing the brightness value of the active light source.

In one aspect, the processing unit further identifies a first pupil region according to the first image frame and identifies a second pupil region according to the second image frame, and defines a joined region of the first pupil region and the second pupil region as an outputted pupil region.

In one aspect, the pupil tracking device includes four active light sources, and the processing unit identifies four active light images in the differential image and respectively calculates a positioning coordinate associated with the four active light images. The processing unit may further calculate an eyeball center according to the four positioning coordinates.

In one aspect, the processing unit is further configured to identify an outputted pupil region according to the first image frame and the second image frame, and define a direction of connecting line of the eyeball center and the outputted pupil region as a direction of line of sight.

In the pupil tracking device according to the embodiment of the present disclosure, the active light image is referred to the reflection image of the active light source on the cornea.

In the pupil tracking device according to the embodiment of the present disclosure, the active light image is served as a positioning reference point in pupil tracking. Therefore, the pupil tracking device is preferably disposed on a head accessory so as to fix the position of the active light image in the eyeball.

In the pupil tracking device according to the embodiment of the present disclosure, the accuracy of pupil tracking may be effectively improved by accurately identify the position of the active light image to be served as the positioning reference point and by calculating the differential image to eliminate the effect from ambient light sources.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
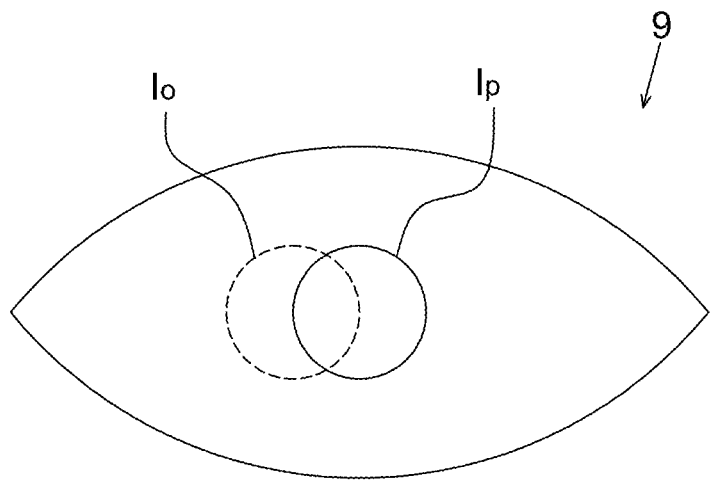
FIG. 1 shows a schematic diagram of the eye image.
Figure 2A:
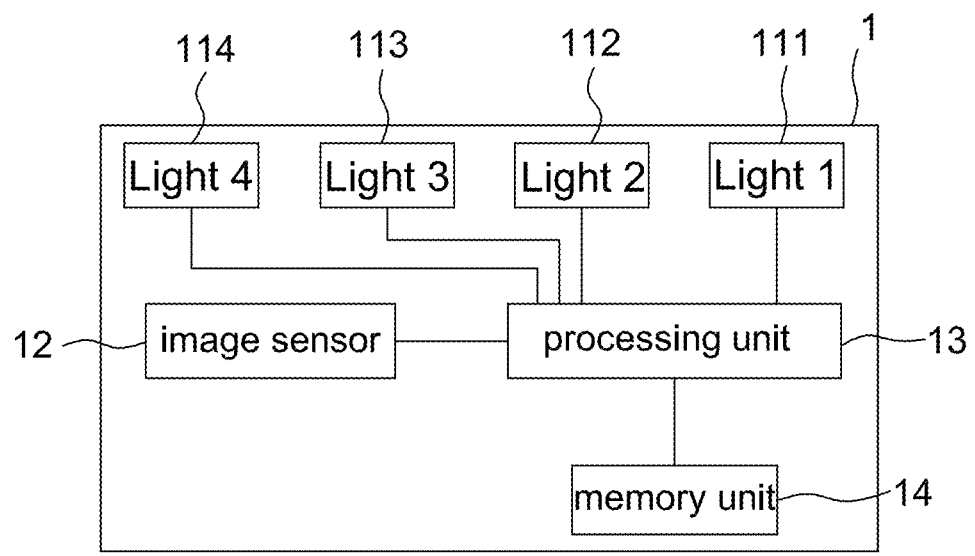
FIG. 2A shows a schematic block diagram of the pupil tracking device according to an embodiment of the present disclosure.
Figure 2B:
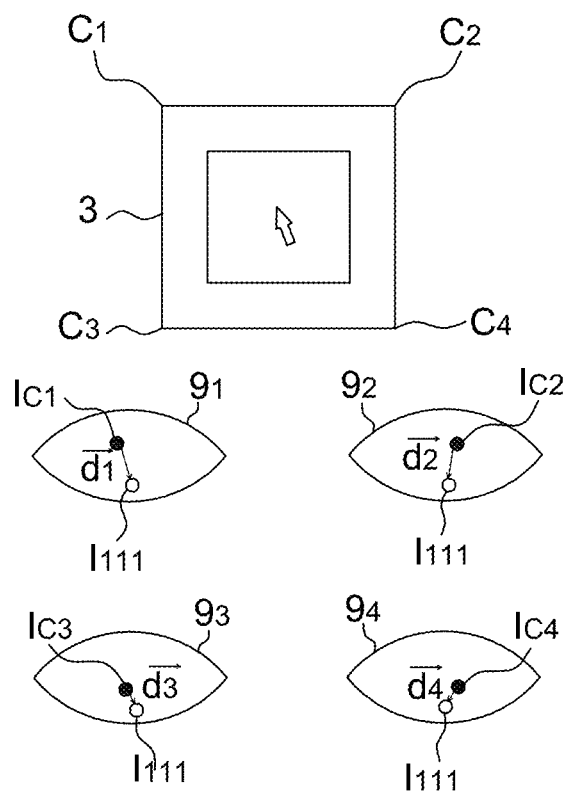
FIG. 2B shows a schematic diagram of the pupil coordinate information in the pupil tracking device according to the embodiment of the present disclosure

Referring to FIG. 2A, it shows a schematic block diagram of the pupil tracking device according to an embodiment of the present disclosure, which includes at least one active light source (e.g. four active light sources 111 to 114 shown herein), an image sensor 12, a processing unit 13 and a memory unit 14. The pupil tracking device 1 of this embodiment uses the active light source to project at least one active light image on an eyeball 90 to be served as a positioning reference point, and determines a pupil coordinate according to the relationship between a pupil position and the positioning reference point (i.e. the active light image), wherein the active light image is referred to a reflection image of the active light source on the cornea. The pupil tracking device 1 may wired or wirelessly transmit the pupil coordinate to an image display device 3 (FIG. 2B) to accordingly control the image display device 3 to perform a corresponding function. It should be mentioned that the purpose of using four active light sources is to calculate an eyeball center, but if it is to perform the pupil tracking only, any number of the active light sources may be used.

Generally speaking, when the eyeball 90 looks downward, the upper eyelid covers a part of the eyeball 90. Therefore, if the pupil tracking device 1 is disposed on a head accessory 2, the disposed position of the image sensor 12 is preferably lower than the eyeball 90 to avoid the pupil cannot be detected when the eyeball 90 looks downward (i.e. the pupil moving downward).

The active light sources 111 to 114 may be infrared light sources, e.g. infrared light emitting diodes, to avoid affecting the vision during lighting. The active light sources 111 to 114 are configured to emit light toward the eyeball 90 so as to illuminate the eyeball 90 and form reflection light spots on the eyeball 90 (i.e. the active light images on the eyeball 90). It should be mentioned that each active light source may include only one light emission element or arranged by a plurality of light emission elements.

The image sensor 12 may be the sensor configured to sense optical energy such as a CCD image sensor and a COMS image sensor, and captures image frames of the eyeball 90 at a frame rate corresponding to the lighting of the active light sources 111 to 114. The image sensor 12 may capture image frames with a fixed or variable exposure time and gain. It should be mentioned that the frame rate of the image sensor 12 may not be equal to the lighting frequency of the active light sources 111 to 114.

The processing unit 13 is configured to control the lighting of the active light sources 111 to 114 and the image capturing of the image sensor 12, and to identify the pupil position, pupil coordinate, active light image, eyeball center and direction of line of sight according to the image frames captured by the image sensor 12 (described later). In other embodiments, the processing unit 13 may also be formed by a plurality elements without any limitation, e.g. an independent light control unit for controlling the active light sources 111 to 114 and an independent digital signal processor (DSP) for performing the image post-processing.

The memory unit 14 is configured to save pupil coordinate information associated with the active light image and the pupil position. In this manner, when the processing unit 13 obtains a current relationship between the current pupil position and the active light image, a current pupil coordinate may be obtained according to the previously saved pupil coordinate information. For example referring to FIG. 2B, the pupil tracking device 1 according to the embodiment of the present disclosure may include a setup procedure that may be automatically entered before each operation or entered according to an instruction. In the setup procedure, a user may sequentially stare at predetermined reference points, e.g. four corners $C_1$ to $C_4$ of the image display device 3, but not limited to.

Meanwhile the image sensor 12 sequentially captures four eye images $9_1$ to $9_4$, and each of the eye images $9_1$ to $9_4$ respectively contains a pupil image $I_{C1}$ to $I_{C4}$ and an active light image $I_{111}$, wherein the active light image $I_{111}$ locates at the same (or corresponding) position in the four eye images $9_1$ to $9_4$. For example, when the user stares at the reference point $C_1$, the image sensor 12 captures the eye image $9_1$, wherein a vector from the pupil image $I_{C1}$ to the active light image $I_{111}$ is assumed to be $\vec{d_1}$; similarly, the processing unit 13 may respectively calculate vectors $\vec{d_2}$ to $\vec{d_4}$ in the eye images $9_2$ to $9_4$. The pupil tracking device 1 then defines an operating space according to the vectors $\vec{d_1}$ to $\vec{d_4}$ to be previously saved in the memory unit 14. In this manner, in actual operation the processing unit 13 may calculate a current pupil coordinate according to the operating space. It should be mentioned that directions of the vectors $\vec{d_1}$ to $\vec{d_4}$ in FIG. 2B may be reversed.

Figure 3A:
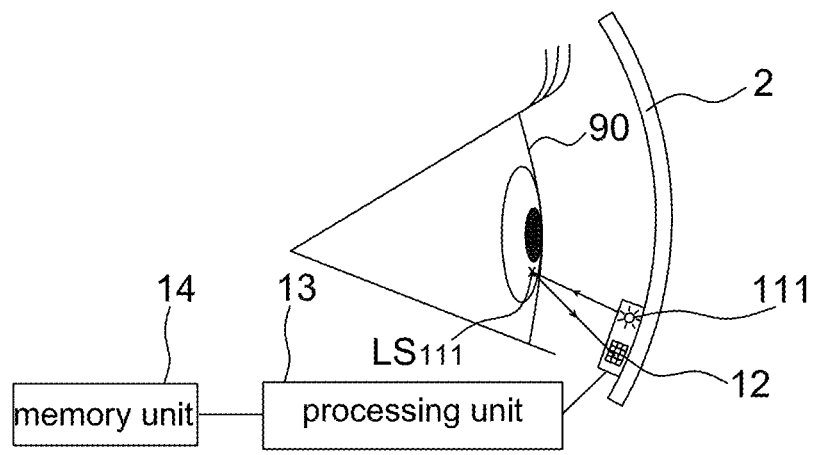
FIG. 3A shows an operational schematic diagram of the pupil tracking device according to an embodiment of the present disclosure.
Figure 3B:
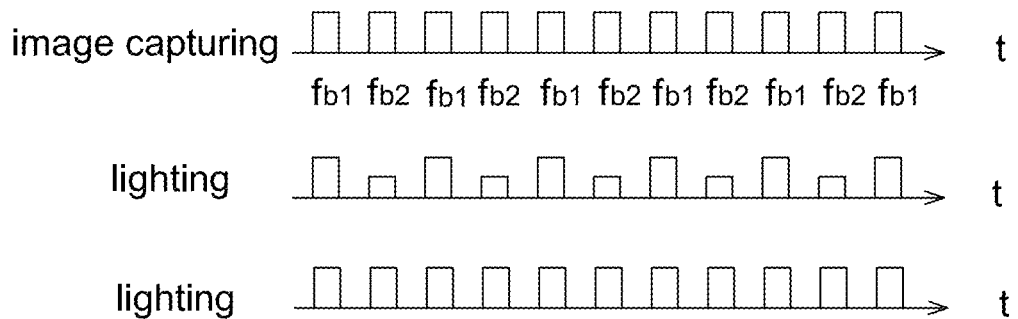
FIG. 3B shows a schematic diagram of the image capturing and the lighting of the light source of the pupil tracking device according to an embodiment of the present disclosure.

Referring to FIG. 3A, it shows an operational schematic diagram of the pupil tracking device 1 according an embodiment of the present disclosure. The pupil tracking device 1 includes an active light source 111, an image sensor 12, a processing unit 13 and a memory unit 14. As mentioned above the memory unit 14 is configured to save pupil coordinate information associated with the active light image and the pupil position, and thus details thereof are not repeated herein.

Figure 3C:
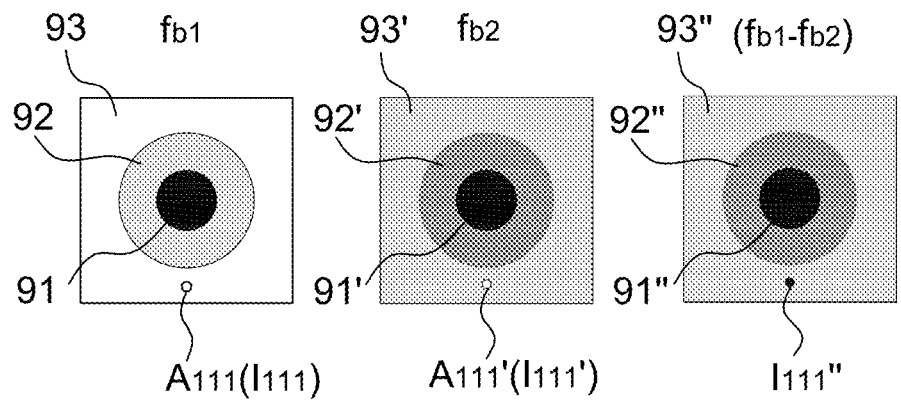
FIG. 3C shows a schematic diagram of identifying the active light image in the pupil tracking device according to an embodiment of the present disclosure.
Figure 3D:
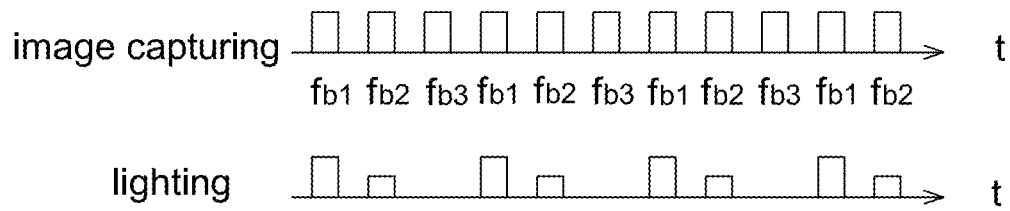
FIG. 3D shows a schematic diagram of the image capturing and the lighting of the light source of the pupil tracking device according to another embodiment of the present disclosure.

Referring to FIGS. 3A-3D, FIG. 3B shows a schematic diagram of the image capturing of the image sensor 12 and the lighting of the active light source 111 in the pupil tracking device of FIG. 3A; FIG. 3C shows a schematic diagram of identifying the active light image $I_{111}$ by the processing unit 13 in the pupil tracking device of FIG. 3A; and FIG. 3D shows another schematic diagram of the image capturing of the image sensor 12 and the lighting of the active light source 111 in the pupil tracking device of FIG. 3A.

The active light source 111 emits light toward an eyeball 90 alternatively in a first brightness value and a second brightness value. The image sensor 12 captures a first brightness image $f_{b1}$ corresponding to the first brightness value and a second brightness image $f_{b2}$ corresponding to the second brightness value. For example in FIG. 3C, the first brightness image $f_{b1}$ contains a brightest region $A_{111}$ (i.e. the active light image), a pupil image 91, an iris image 92 and a cornea area 93. The second brightness image $f_{b2}$ contains a brightest region $A_{111}'$ (i.e. the active light image), a pupil image 91', an iris image 92' and a cornea area 93'. As the pupil tracking device 1 according to the embodiment of the present disclosure is preferably disposed on a head accessory 2 to allow the active light source 111 to keep a fixed relative position with respect to the eyeball 90, the brightest regions $A_{111}$ and $A_{111}'$ are at corresponding (or identical) positions in different brightness images. The active light image is the direct reflection point of the active light source 111 on the cornea, and thus the active light image is the brightest region in the brightness image. Therefore, the processing unit 13 may identify a brightest region at the corresponding positions (i.e. $A_{111}$ and $A_{111}'$) in the first brightness image $f_{b1}$ and the second brightness image $f_{b2}$ as an active light image $I_{111}$, wherein said brightest region is referred to the region having the highest gray level. As the space relationship between the eyeball 90 and ambient light sources is not fixed, the ambient light source image does not locate at the same position in different brightness images. Accordingly, although there may be other ambient light source images contained in the brightness image captured by the image sensor 12, the effect from ambient light sources may be eliminated by searching the brightest region at corresponding positions. In other embodiments, the image sensor 12 may further capture an image (e.g. a third brightness image) $f_{b3}$ when the active light source 111 is turned off as shown in FIG. 3D, and then subtracts the third brightness image $f_{b3}$ from the first brightness image $f_{b1}$ and the second brightness image $f_{b2}$ respectively to obtain $f_{b13}$ and $f_{b23}$ so as to eliminate the interference from ambient light and stabilize the detection of the active light image of the brightest region.

Furthermore, in addition to changing the brightness value of the active light source 11 (e.g. changing the drive current thereof), the same object may be achieved by fixing the brightness value of the active light source 111 but changing the sampling parameter (e.g. including the exposure time and gain) of the image sensor 12. That is, in another embodiment the first brightness value is equal to the second brightness value, and the image sensor 12 captures the first brightness image $f_{b1}$ with a first exposure time and a first gain and captures the second brightness image $f_{b2}$ with a second exposure time and a second gain, wherein the first exposure time is not equal to the second exposure time and/or the first gain is not equal to the second gain.

Figure 4:
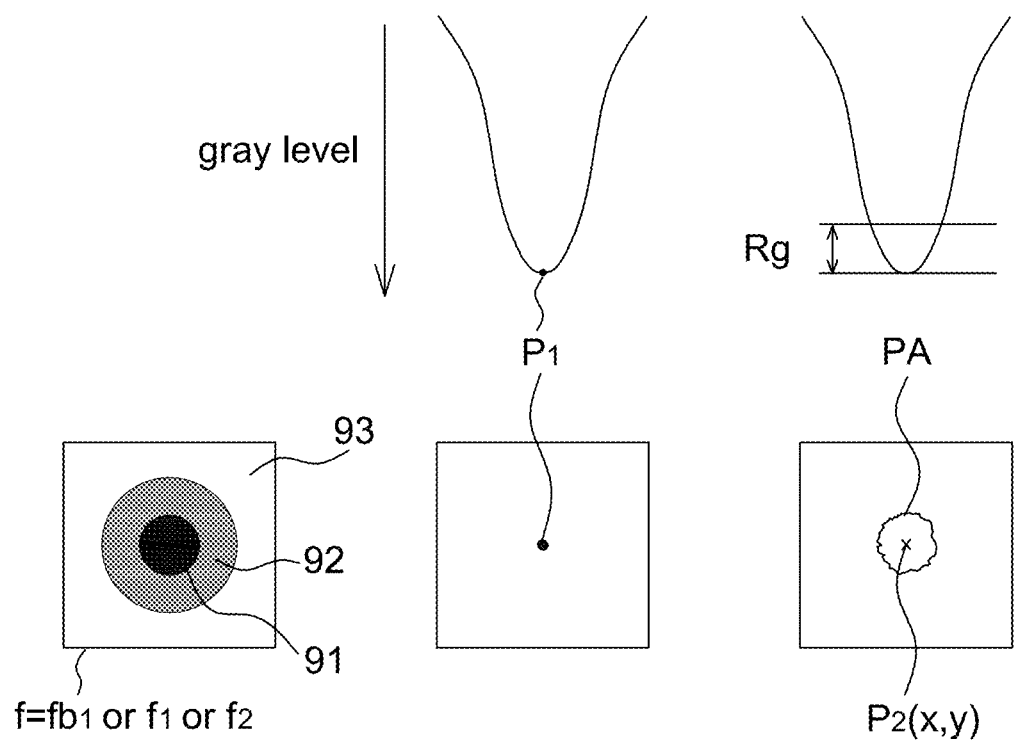
FIG. 4 shows a schematic diagram of identifying the pupil position in the pupil tracking device according to the embodiment of the present disclosure.

In addition, in this embodiment the processing unit 13 may further identify a pupil position according to the first brightness image $f_{b1}$ or the second brightness image $f_{b2}$, wherein the processing unit 13 preferably identifies the pupil position according to the brightness image having higher brightness so as to clearly identify the pupil image 91. For example referring to FIG. 4, the processing unit 13 is configured to calculate a lowest gray level $P_1$ in the first brightness image $f_{b1}$ (e.g. assuming the first brightness value is higher than the second brightness value) and to identify a plurality of pixels around the lowest gray level $P_1$ and having gray levels within a gray level range Rg as a pupil region PA. When the active light source 11 is turned on, the pupil image 91 has the lowest brightness, the cornea area 93 has the highest brightness and the iris image 92 has the brightness between the pupil image 91 and the cornea area 93, and thus the lowest gray level $P_1$ appears in the pupil image 91. Therefore, the pixel region neighboring to the lowest gray level $P_1$ may be defined as the pupil region PA. The pixel region neighboring to the lowest gray level $P_1$ and adjacent to each other may be defined as a same object by using the image grouping, for example referred to U.S. Patent Pub. No. 2011/0176733, entitled "Image recognition method" and assigned to the same assignee of the present application. In addition, the gray level range Rg may be set according to the operation environment of the pupil tracking device 1, e.g. different gray level ranges Rg may be set for outdoor and indoor use. Furthermore, to avoid noise interference, the processing unit 13 may further identify whether the pupil region PA is belong to the ambient light source image according the size and shape thereof, e.g. when the size is too small and the shape is not a circle, it may be the ambient light source image and is removed.

Next, the processing unit 13 may calculate a gravity center or a center of the pupil region PA to be served as a pupil position $P_2$, and output a pupil coordinate (x,y) according to a relative position between the pupil position $P_2$ and the active light image $I_{111}$ and referencing the pupil coordinate information saved in the memory unit 14. The processing unit 13 may relatively control a cursor motion on an image display device 3 according to the pupil coordinate (x,y). It is appreciated that the pupil position $P_2$ may not be equal to the position of the lowest gray level $P_1$.

In a word, in this embodiment the processing unit 13 identifies the active light image $I_{111}$ according to two image frames but identifies the pupil position $P_2$ with only one image frame (e.g. the brighter image) so as to eliminate the interference from ambient light sources and the active light image is served as a positioning reference point in pupil tracking.

In another embodiment, in order to further eliminate the influence from ambient light sources, the processing unit 13 may further calculate a differential image $(f_{b1}-f_{b2})$ between the first brightness image $f_{b1}$ and the second brightness image $f_{b2}$, and compare a darkest region in the differential image $(f_{b1}-f_{b2})$ with the first brightness image $f_{b1}$ or the second brightness image $f_{b2}$ so as to identify an active light image $I_{111}"$ (as shown in FIG. 3C), wherein said darkest region is referred to the region having the lowest gray level, e.g. about 0 gray level or a relative lowest with respect to other pixel gray levels.

More specifically speaking, as the active light image $I_{111}$ (i.e. the brightest region $A_{111}$ and $A_{111}'$) has the highest brightness (e.g. the highest gray level of the used gray level scale) in the first brightness image $f_{b1}$ and the second brightness image $f_{b2}$, the active light image $I_{111}"$ in the differential image $(f_{b1}-f_{b2})$ has the lowest brightness. For example in one embodiment, it is assumed that the active light image $I_{111}$ is 255 gray level, the pupil image 91 is 0 gray level, the iris image 92 is 128 gray level and the cornea area 93 is 228 gray level in the first brightness image $f_{b1}$; and the active light image $I_{111}'$ is 255 gray level, the pupil image 91' is 0 gray level, the iris image 92' is 64 gray level and the cornea area 93' is 100 gray level in the second brightness image $f_{b2}$. Therefore, it is obtained that the active light image $I_{111}"$ is 0 gray level, the pupil image 91" is 0 gray level, the iris image 92" is 64 gray level and the cornea area 93" is 128 gray level in the differential image $(f_{b1}-f_{b2})$. As the pupil images 91 and 91' are both 0 gray level, the pupil image 91" in the differential image $(f_{b1}-f_{b2})$ also has the lowest brightness. Now, the position of the active light image $I_{111}"$ (as shown in FIG. 3C) may be identified by comparing the differential image $(f_{b1}-f_{b2})$ with the first brightness image $f_{b1}$ or the second brightness image $f_{b2}$. Since the pupil images 91 and 91' have the lowest brightness in the first brightness image $f_{b1}$ or the second brightness image $f_{b2}$, the method of comparison may be performed by identifying the image object whose gray level changes from relative brightest to darkest when comparing the first brightness image $f_{b1}$ with the differential image $(f_{b1}-f_{b2})$ so as to accordingly determine the position of the active light image $I_{111}"$ (as shown in FIG. 3C), or identifying the image object whose gray level changes from relative brightest to darkest when comparing the second brightness image $f_{b2}$ with the differential image $(f_{b1}-f_{b2})$ so as to accordingly determine the position of the active light image $I_{111}"$ (as shown in FIG. 3C). In another embodiment, it is able to identify the object image in the differential image $(f_{b1}-f_{b2})$ having the lowest brightness and a smaller area as the active light image and identify the object image having the lowest brightness and a larger area as the pupil image.

Furthermore, in this embodiment in addition to that the calculation of the active light image $I_{111}$ is performed by using the differential image $(f_{b1}-f_{b2})$, the method of identifying the pupil position, constructing the pupil coordinate information and implementing the first brightness image $f_{b1}$ and the second brightness image $f_{b2}$ is similar to the previous embodiment, and thus details thereof are not repeated herein.

Figure 5A:
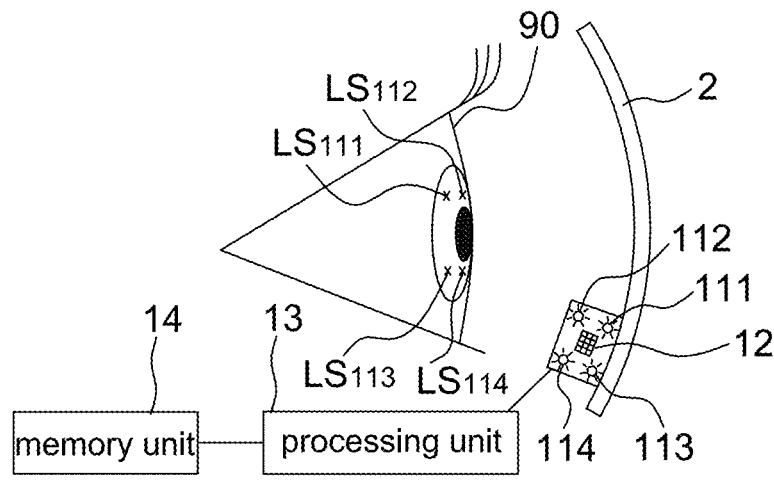
FIG. 5A shows an operational schematic diagram of the pupil tracking device according to another embodiment of the present disclosure.

Referring to FIG. 5A, it shows an operational schematic diagram of the pupil tracking device 1 according to another embodiment of the present disclosure. The pupil tracking device 1 includes four active light sources 111 to 114, an image sensor 12, a processing unit 13 and a memory unit 14. As mentioned above the memory unit 14 is configured to save pupil coordinate information associated with the active light image and the pupil position, and thus details thereof are not repeated herein.

Figure 5B:
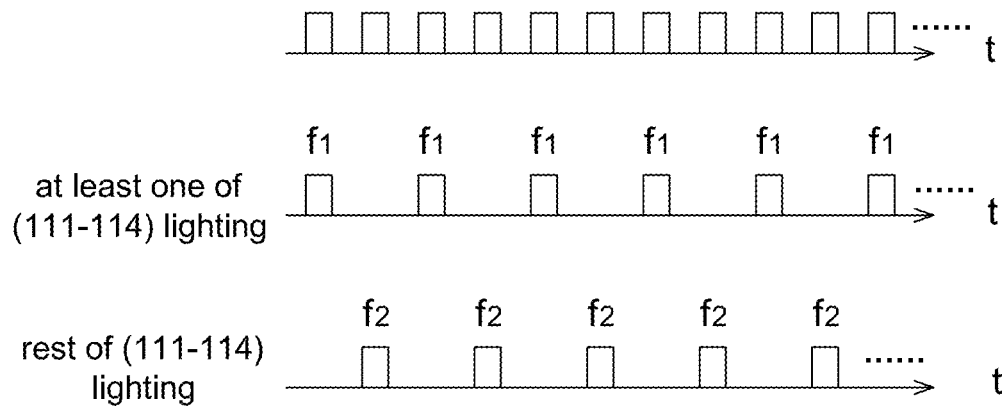
FIG. 5B shows a schematic diagram of the image capturing and the lighting of the light source of the pupil tracking device according to another embodiment of the present disclosure.
Figure 5C:
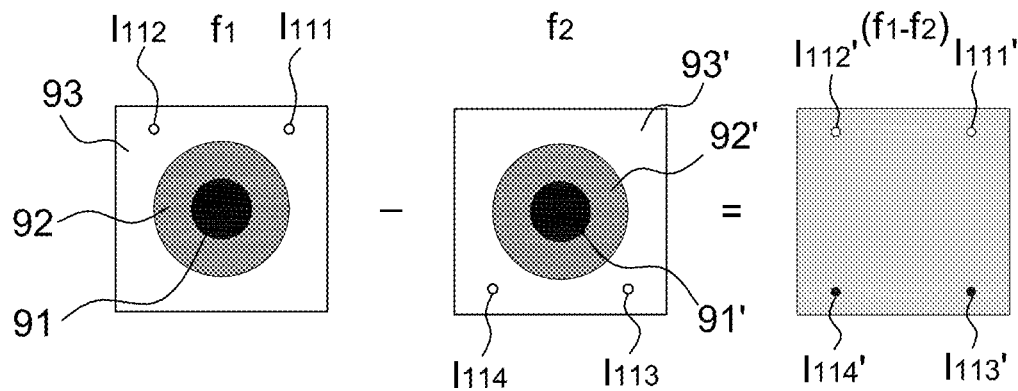
FIG. 5C shows a schematic diagram of identifying the active light image in the pupil tracking device according to another embodiment of the present disclosure.

Referring to FIGS. 5A-5C, FIG. 5B shows a schematic diagram of the image capturing of the image sensor 12 and the lighting of the active light sources 111 to 114 in the pupil tracking device of FIG. 5A; and FIG. 5C shows a schematic diagram of identifying the active light image by the processing unit 13 in the pupil tracking device of FIG. 5A. As mentioned above, the purpose of using four active light sources is to calculate the eyeball center, and if it is to perform the pupil tracking only, using at least two active light sources may achieve the object of the present embodiment.

The active light sources 111 to 114 alternatively emit light toward an eyeball 90 so as to form reflection light spots $LS_{111}$ to $LS_{114}$ on the eyeball 90. The image sensor 112 captures a first image frame f1 and a second image frame f2 corresponding to the lighting of different combinations of the active light sources 111 to 114. The processing unit 13 is configured to calculate a differential image (f1−f2) between the first image frame f1 and the second image frame f2, and identify a darkest region (e.g. $I_{113}'$ and $I_{114}'$) and a brightest region (e.g. $I_{111}'$ and $I_{112}'$) in the differential image (f1−f2) as the active light image.

For example in FIG. 5C, when the active light sources 111 and 112 are turned on (the active light sources 113 and 114 turned off now), the image sensor 12 captures a first image frame f1, which contains a pupil image 91, an iris image 92, a cornea area 93 and reference active light images $I_{111}$ and $I_{112}$; and when the active light sources 113 and 114 are turned on (the active light sources 111 and 112 turned off now), the image sensor 12 captures a second image frame f2, which contains a pupil image 91', an iris image 92', a cornea area 93' and reference active light images $I_{113}$ and $I_{114}$, wherein the light source brightness associated with the first image frame f1 and the light source brightness associated with the second image frame f2 may or may not identical without any limitation. In addition in other embodiments, at least one of the active light sources 111 to 114 (e.g. one or three active light sources) are turned on corresponding to the capturing of the first image frame f1 and the rest active light sources (e.g. three or one active light source) are turned on corresponding to the capturing of the second image frame f2; i.e. it is not limited to turn on two active light sources at the same time. When the second image frame f2 is subtracted from the first image frame f1, the reference active light images $I_{111}$ and $I_{112}$ become the brightest regions to have the highest gray level, and the reference active light images $I_{113}$ and $I_{114}$ become the darkest regions to have the lowest gray level in the differential image (f1−f2). Accordingly, the processing unit 13 may identify four active light images $I_{111}'$ to $I_{114}'$ in the differential image (f1−f2). In one embodiment, it is assumed that in the first image frame f1 the active light images $I_{111}$ and $I_{112}$ have about +255 gray level, the pupil image 91 has about 0 gray level, the iris image 92 has about 64 gray level and the cornea area 93 has about 128 gray level; and in the second image frame f2 the active light images $I_{113}$ and $I_{114}$ have about +255 gray level, the pupil image 91' has about 0 gray level, the iris image 92' has about 64 gray level and the cornea area 93' has about 128 gray level. Accordingly, it is obtained that in the differential image (f1−f2) the active light images $I_{111}'$ and $I_{112}'$ are about +127 gray level, the active light images $I_{113}'$ and $I_{114}'$ are about −127 gray level and other parts are about 0 gray level. In another embodiment, it is able to adjust all gray levels to allow every gray level to be larger than or equal to zero. For example, the active light images $I_{111}'$ and $I_{112}'$ may be adjusted to about +254 gray level, the active light images $I_{113}'$ and $I_{114}'$ may be adjusted to about 0 gray level and other parts are adjusted to about +127 gray level. It should be mentioned that the above gray levels are only exemplary.

As four active light sources 111 to 114 are used in this embodiment, after identifying the four active light images $I_{111}'$ to $I_{114}'$ in the differential image (f1−f2), the processing unit 13 may respectively calculate a positioning coordinate associated with the four active light images $I_{111}'$ to $I_{114}'$, and each of the positioning coordinates may be a three-dimensional coordinate. The processing unit 13 may calculate an eyeball center of the eyeball 90 according to the four positioning coordinates, e.g. calculating by the sphere equation $(x-x_0)^2+(y-y_0)_2+(z-z_0)^2=r^2$. In this manner, the processing unit 13 may further define a direction of connection line of the eyeball center and an outputted pupil region as a direction of line of sight.

In this embodiment, the outputted pupil region may be determined as following. First, the processing unit 13 identifies a first pupil region according to the first image frame f1 and a second pupil region according to the second image frame f2. The method of identifying the pupil region is similar to FIG. 4; i.e. the processing unit 13 identifies a plurality of pixels around a lowest gray level (e.g. $P_1$) in the first image frame f1 and having gray levels within a gray level range Rg as the first pupil region (e.g. PA); and the processing unit 13 identifies a plurality of pixels around a lowest gray level (e.g. $P_1$) in the second image frame f2 and having gray levels within the gray level range Rg as the second pupil region (e.g. PA). After the first pupil region and the second pupil region are identified, the processing unit 13 calculates a gravity center or a center of the first pupil region to be served as a first pupil position (e.g. $P_2$) and calculates a gravity center or a center of the second pupil region to be served as a second pupil position (e.g. $P_2$).

As two image frames may be used to obtain the pupil image in this embodiment, the processing unit 13 may define a joined region of the first pupil region and the second pupil region as an outputted pupil region. Similarly, the processing unit 13 may determine an outputted pupil coordinate according to the outputted pupil region and the pupil coordinate information previously saved in the memory unit 14, and the four active light images are served as positioning reference points herein. In other embodiments, the processing unit 13 may select one of the first pupil region and the second pupil region as the outputted pupil region.

In addition, the pupil tracking device 1 according to the embodiment of the present disclosure may cooperate with a display unit for displaying images, and the display unit may be integrated on the head accessory 2, e.g. glasses or a goggle.

The pupil tracking device 1 according to the embodiment of the present disclosure may further have the blinking detection function. For example, the processing unit 13 may record time intervals in which the pupil is detected and not detected respectively thereby identifying the blinking action.

The pupil tracking device 1 according to the embodiment of the present disclosure may further have sleep detection and distraction detection functions. For example, when the pupil tracking device 1 is applied to the vehicle devices, it is able to detect whether the driver is sleepy or watches ahead and give a warning in suitable time. The sleep detection may be implemented by detecting the time ratio of eye closing and eye opening, and the distraction detection may be implemented by detecting the direction of line of sight of the driver.

The pupil tracking device 1 according to the embodiment of the present disclosure may further have blinking frequency detection and dry eye detection functions. More specifically speaking, the processing unit 13 may derive the possibility and extend of dry eye according to the detected blinking frequency and notify the user to blink his or her eyes.

The pupil tracking device 1 according to the embodiment of the present disclosure may further have the gesture recognition function. The gesture recognition mentioned herein may be, for example, detecting the pupil moving toward a predetermined direction for predetermined times and comparing the detected results with predetermined gestures so as to achieve the operation of performing specific function(s). The gesture recognition is similar to the hand gesture recognition using other parts of the body, e.g. the hand or finger(s).

The pupil tracking device 1 according to the embodiment of the present disclosure may further have the power saving function. For example, a power saving mode may be entered when the pupil is not detected or the image variation between image frames is too small for a predetermined time interval.

It is appreciated that the ratio of the active light image and the pupil image in the drawings herein are only exemplary.

It should be mentioned that the pupil tracking device 1 according to the embodiment of the present disclosure may be directly manufactured as a head mounted pupil tracking device or may be fixed, using a securing member, on a head accessory, e.g. the glasses, goggle or hat that is worn, covered or mounted on the user's head. Preferably the active light source does not have relative movement with respect to the human eye, and the active light image is served as the positioning reference point in pupil tracking.

As mentioned above, as the conventional pupil tracking device is not able to eliminate the interference from ambient light sources, misdetection may be caused during operation. Therefore, the present disclosure further provides a pupil tracking device (FIGS. 2A, 3A and 5B) that includes an active light source having a fixed relative position with respect to the eyeball to be served as a positioning reference point so as to eliminate the interference from ambient light sources thereby improving the detection accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A pupil tracking device, comprising:
    a single light source configured to emit light toward an eyeball in a first brightness value at a first time to form a first reflection spot on the eyeball, and the single light source configured to emit light toward the eyeball in a second brightness value at a second time to form a second reflection spot on the eyeball, wherein the first brightness value is different from the second brightness value, and the first time is different from the second time;
    an image sensor configured to capture a first image containing a brightest region associated with the first reflection spot on the eyeball corresponding to the first brightness value and a second image containing a brightest region associated with the second reflection spot on the eyeball corresponding to the second brightness value, wherein the image sensor is further configured to capture a third image when the single light source is being turned off; and
    a processing unit electrically coupled to the image sensor and the single light source, and configured to
        calculate a first differential image between the first image and the third image, and calculate a second differential image between the second image and the third image;
        calculate a differential image between the first differential image and the second differential image, and
        identify a darkest region in the differential image as an image of the single light source projected on the eyeball when a position of the darkest region in the differential image corresponds to a position of the brightest region in the first differential image or the brightest region in the second differential image.

2. The pupil tracking device as claimed in claim 1, wherein the processing unit is further configured to identify a pupil position according to the first differential image or the second differential image.

3. The pupil tracking device as claimed in claim 2, wherein
    the first brightness value is higher than the second brightness value; and
    the processing unit is configured to
        identify a plurality of pixels around a lowest gray level in the first differential image and having gray levels within a gray level range as a pupil region, and
        calculate a gravity center or a center of the pupil region as the pupil position.

4. The pupil tracking device as claimed in claim 2, further comprising a memory unit configured to save pupil coordinate information associated with the image of the single light source and the pupil position.

5. The pupil tracking device as claimed in claim 1, wherein the image sensor is configured to
    capture the first image with a first exposure time and a first gain, and
    capture the second image with a second exposure time and a second gain, wherein the first exposure time is not equal to the second exposure time or the first gain is not equal to the second gain.

6. The pupil tracking device as claimed in claim 1, wherein the pupil tracking device is disposed on a head accessory.

7. The pupil tracking device as claimed in claim 1, wherein the single light source is configured to emit light in the first brightness value and the second brightness value alternatively.

8. A pupil tracking device, comprising:
    a single light source configured to emit light toward an eyeball in a first brightness value at a first time to form a first reflection spot on the eyeball, and the single light source configured to emit light toward the eyeball in a second brightness value at a second time to form a second reflection spot on the eyeball, wherein the first brightness value is different from the second brightness value, and the first time is different from the second time;
    an image sensor configured to capture a first image containing a brightest region associated with the first reflection spot on the eyeball corresponding to the first brightness value and a second image containing a brightest region associated with the second reflection spot on the eyeball corresponding to the second brightness value, wherein the image sensor is further configured to capture a third image when the single light source is being turned off; and
    a processing unit electrically coupled to the image sensor and the single light source, and configured to
        calculate a first differential image between the first image and the third image, and calculate a second differential image between the second image and the third image;
        calculate a differential image by subtracting the second differential image from the first differential image, and
        identify one of two darkest regions in the differential image having a smaller area and corresponding to a position of the brightest region in the first or second differential image as an image of the single light source projected on the eyeball, and the other one of the two darkest regions in the differential image having a larger area as a pupil image.

9. The pupil tracking device as claimed in claim 8, wherein the pupil tracking device is disposed on a head accessory.

10. The pupil tracking device as claimed in claim 8, wherein the image sensor is configured to
    capture the first image with a first exposure time and a first gain, and
    capture the second image with a second exposure time and a second gain, wherein the first exposure time is not equal to the second exposure time or the first gain is not equal to the second gain.

11. The pupil tracking device as claimed in claim 8, further comprising a memory unit configured to save pupil coordinate information associated with the image of the single light source and the pupil image.

12. The pupil tracking device as claimed in claim 8, wherein the single light source is configured to emit light in the first brightness value and the second brightness value alternatively.

13. A pupil tracking device, comprising:
- a single light source configured to emit light toward an eyeball in a first brightness value at a first time to form a first reflection spot on the eyeball, and the single light source configured to emit light toward the eyeball in a second brightness value at a second time to form a second reflection spot on the eyeball, wherein the first brightness value is equal to the second brightness value, and the first time is different from the second time;
- an image sensor configured to capture, using a first exposure time, a first image containing a brightest region associated with the first reflection spot on the eyeball corresponding to the first brightness value and capture, using a second exposure time, a second image containing a brightest region associated with the second reflection spot on the eyeball corresponding to the second brightness value, wherein the first exposure time is different from the second exposure time, wherein the image sensor is further configured to capture a third image when the single light source is being turned off; and
- a processing unit electrically coupled to the image sensor and the single light source, and configured to
  - calculate a first differential image between the first image and the third image, and calculate a second differential image between the second image and the third image;
  - calculate a differential image between the first differential image and the second differential image, and
  - identify a darkest region in the differential image as an image of the single light source projected on the eyeball when a position of the darkest region in the differential image corresponds to a position of the brightest region in the first differential image or the brightest region in the second differential image.

14. The pupil tracking device as claimed in claim 13, wherein the image sensor is further configured to
- capture the first image using a first gain,
- capture the second image using a second gain, and
- the first gain is different from the second gain.

15. The pupil tracking device as claimed in claim 13, wherein the processing unit is further configured to identify a pupil position according to the first differential image or the second differential image.

16. The pupil tracking device as claimed in claim 15, further comprising a memory unit configured to save pupil coordinate information associated with the image of the single light source and the pupil position.

17. The pupil tracking device as claimed in claim 13, wherein the pupil tracking device is disposed on a head accessory.

* * * * *